Jan. 13, 1925. 1,523,066
A. A. HANSON
SLEIGH PROPELLING MECHANISM
Filed April 24, 1924  2 Sheets-Sheet 1
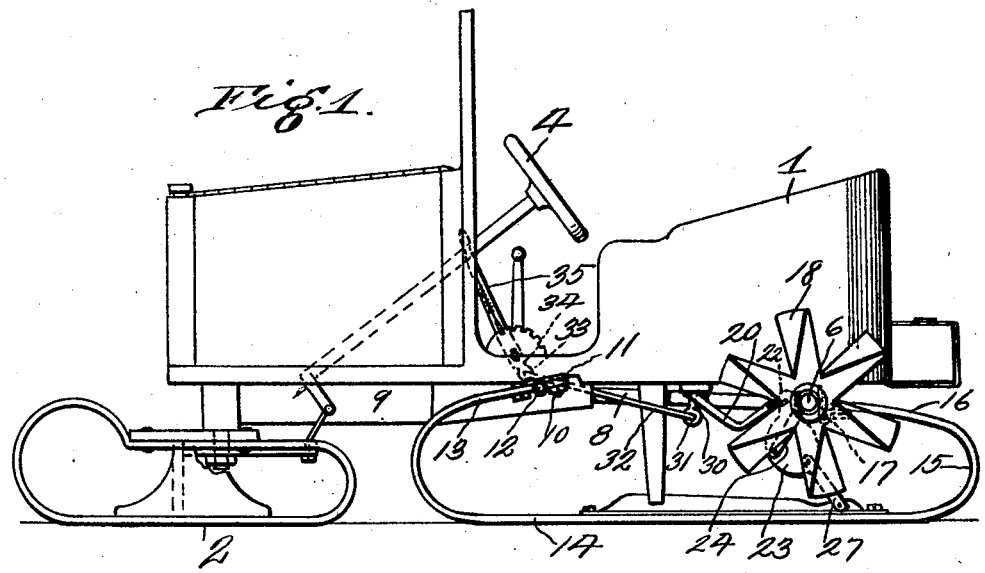
Inventor
A. A. Hanson
By D. Swift
Attorney

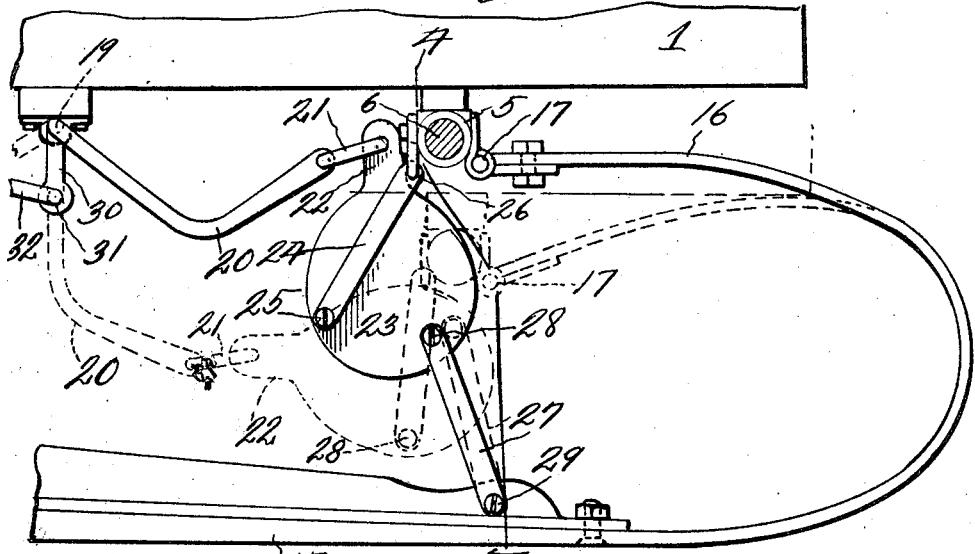
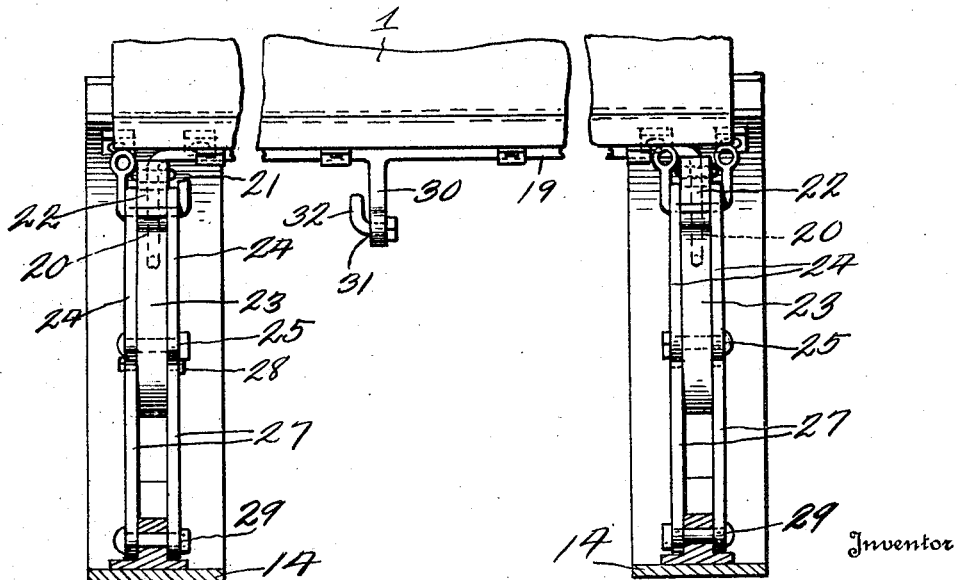

Patented Jan. 13, 1925.

1,523,066

UNITED STATES PATENT OFFICE.

ANDREW A. HANSON, OF CLAYTON, WISCONSIN.

SLEIGH-PROPELLING MECHANISM.

Application filed April 24, 1924. Serial No. 708,714.

*To all whom it may concern:*

Be it known that I, ANDREW A. HANSON, a citizen of the United States, residing at Clayton, in the county of Polk, State of Wisconsin, have invented a new and useful Sleigh-Propelling Mechanism; and I do hereby declare the following to be a full, clear, and exact description of the invention, such as will enable others skilled in the art to which it appertains to make and use the same.

The invention relates to propelling means for sleighs, and has for its object to provide a device of this character comprising rotatable bladed ground engaging wheels at opposite sides of the sleigh, and carried by a drive axle mounted on a flexible arm carried by the rear ends of sleigh runners and overlying the sleigh runners, and means whereby said flexible arms may be flexed as desired for moving the drive wheels into engagement with the snow for gripping the snow and propelling the sleigh. Also to provide means whereby the distance of penetration of the blades of the wheels may be varied according to the softness or hardness of the snow over which the sleigh is propelled.

A further object is to provide discs having link connections with the axle and sleigh runner, and by rotation of which discs the axle and spring arms on which the axle is mounted may be moved downwardly.

A further object is to provide lever means disposed within the sleigh within easy reach of the operator, by means of which lever the discs may be rotated and held in any position to which they may be moved.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the sleigh.

Figure 2 is a top plan view of the sleigh.

Figure 3 is an enlarged side elevation of the rear end of the sleigh, showing the wheels removed and the disc in operative position in dotted lines.

Figure 4 is a transverse sectional view taken on line 4—4 of Figure 3.

Referring to the drawings, the numeral 1 designates the body of the sleigh, which may be of any form, however preferably designed like an automobile body, and 2 the front runners of the sleigh, which are carried by a pivoted truck 3, controlled by a steering wheel 4 for steering the device, and it is to be understood that any form of steering mechanism may be used. Disposed beneath the rear end of the body 1, and carried thereby is an axle housing 5, in which housing axles 6 are driven by a conventional form of differential 7, drive shaft 8 and engine 9, which engine is carried by the forward end of the body 1 of the sleigh. Secured to the under side of the body by means of bolts 10 are plates 11, and to which plates are pivotally connected at 12, the upwardly and rearwardly curved arms 13 of the sleigh runners 14, which support the rear end of the sleigh. The rear ends of the sleigh runners 14 are bent at 15, thereby forming the spring arms 16 which overlie the runners 14 and have their ends connected at 17 to the axle housing 5, therefore it will be seen that the axle housing is spring supported by the arms 16 of the runners, which also obviates the necessity of the use of springs.

Mounted on the outer ends of the axles 6 are bladed drive wheels 18, which wheels are adapted to be moved downwardly into engagement with the snow adjacent the runners 14 for propelling the sleigh and to penetrate the snow at different distances according to the condition of the snow, thereby preventing spinning of the wheels, and insuring a positive driving of the sleigh at all times.

Extending transversely beneath the body 1 of the sleigh is a rock shaft 19, which rock shaft adjacent its ends is provided with rearwardly extending arms 20 which have link connections 21 with the upper ends 22 of discs 23. Discs 23 are connected to the axle housing by means of links 24 disposed on opposite sides of the discs and pivotally connected at 25 to the discs and at 26 to the axle housing, therefore it will be seen that when the discs 23 are rocked, a downward pull is imparted on the links 24, thereby flexing the arms 16 of the runners and moving the body and axle carried thereby downwardly until the bladed wheels 18 engage the snow adjacent the runners for propelling the sleigh. Cams 23 are provided with link connections 27 on opposite sides thereof, which link connections are pivotally connected at 28 to the cams and at 29 to the runners 14, therefore it will be seen that when the cams 23 are simultaneously rocked to the dotted line position shown in Figure 3, the links 27 will hold the disc 26 against upward movement as the links 24 pull downwardly on the axle casing. Extending downwardly from the rock shaft 19 is an arm 30, to which arm is pivotally connected at 31 a forwardly extending connecting rod 32. Connecting rod 32 has its forward end pivotally connected at 33 to the arm 34 of the pivoted lever 35, and by manipulation of which lever the discs 23 may be rotated and held in any position to which they are moved for propelling the sleigh.

From the above it will be seen that a sleigh propelling mechanism is provided, which is simple in construction, and one wherein the rear end of the sleigh body is supported on a spring arm above the rear sleigh runners, which spring arms have sufficient rigidity to normally maintain the rear end of the sleigh body raised, and the wheels out of engagement with the ground, and mechanism provided for simultaneously flexing the spring arms of the runners downwardly for moving the bladed wheels into engagement with snow adjacent the sides of the runners for propelling the sleigh.

The invention having been set forth what is claimed as new and useful is:—

1. The combination with a sled comprising a body, front and rear supporting runners, of means for propelling said sled, said means comprising a drive axle carried by the body over the rear runners, a housing for said axle, spring arms carried by the rear ends of the runners and overlying the runners, said spring arms having their ends connected to the axle housing, rotatable discs, link connections between the discs and the axle housing, link connections between the discs and the runners, ground engaging wheels carried by the axle and means for rotating said discs whereby said body and axle will be moved downwardly and the spring arms flexed.

2. The combination with a sleigh body, runners beneath said body, spring arms carried by said runners and supporting the body, of means connecting the body and the runners whereby said body may be pulled downwardly against the action of the spring arms, ground engaging propelling wheels carried by said body, and means for holding the body in any position it may be moved in relation to the runners.

3. The combination with a sleigh body, a runner, a spring arm overlying the runner and connected to the body, ground engaging propelling members carried by the body, of means for moving said body downwardly against the action of the spring arms, said means comprising rotatable discs above the runners, link connections between the discs and the runners and link connections between the discs and the body.

In testimony whereof I have signed my name to this specification in the presence of two subscribing witnesses.

ANDREW A. HANSON.

Witnesses:
JOSEPH KUCHENMEISTER,
SEVER OLSON.